(12) United States Patent
Polito et al.

(10) Patent No.: US 11,292,334 B2
(45) Date of Patent: Apr. 5, 2022

(54) STACKED REINFORCEMENT ASSEMBLY FOR GRILLE OF MOTOR VEHICLE

(71) Applicant: Ford Global Technologies, LLC, Dearborn, MI (US)

(72) Inventors: Adam Michael Polito, Farmington Hills, MI (US); Vince S. Carnes, Ypsilanti, MI (US); Kevin Berington Johnson, Plymouth, MI (US); Matthew Smith, Ferndale, MI (US); Mohammed Shenaq, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 72 days.

(21) Appl. No.: 16/808,535

(22) Filed: Mar. 4, 2020

(65) Prior Publication Data
US 2021/0276412 A1 Sep. 9, 2021

(51) Int. Cl.
  *B60K 11/00* (2006.01)
  *B60K 11/08* (2006.01)
  *B60R 19/52* (2006.01)
(52) U.S. Cl.
  CPC .......... *B60K 11/085* (2013.01); *B60R 19/52* (2013.01); *B60R 2019/525* (2013.01)
(58) Field of Classification Search
  CPC .. B60K 11/085; B60R 19/52; B60R 2019/525
  See application file for complete search history.

(56) References Cited

U.S. PATENT DOCUMENTS

| | | | | |
|---|---|---|---|---|
| 3,926,463 A * | 12/1975 | Landwehr | ............... | B60R 19/18 293/136 |
| 6,406,081 B1 * | 6/2002 | Mahfet | ................... | B60R 19/18 293/133 |
| 6,997,490 B2 * | 2/2006 | Evans | ..................... | B60R 19/18 293/104 |
| 8,646,552 B2 * | 2/2014 | Evans | ..................... | B60R 19/18 180/68.1 |
| 9,067,552 B1 * | 6/2015 | Cheng | ..................... | B60R 19/14 |
| 9,919,667 B2 * | 3/2018 | Muralidharan | ......... | B60R 19/18 |
| 10,464,514 B2 * | 11/2019 | Sertkaya | ................ | B60R 19/00 |
| 2007/0257497 A1 * | 11/2007 | Heatherington | ........ | B60R 19/18 293/120 |
| 2012/0019025 A1 * | 1/2012 | Evans | .................. | B62D 35/005 296/193.1 |
| 2019/0359155 A1 | 11/2019 | Shenaq et al. | | |

FOREIGN PATENT DOCUMENTS

DE 102005050110 A1 4/2007
KR 20090108773 A 10/2009

* cited by examiner

*Primary Examiner* — Hau V Phan
(74) *Attorney, Agent, or Firm* — Vichit Chea; Carlson, Gaskey & Olds, P.C.

(57) ABSTRACT

This disclosure relates to a stacked reinforcement assembly for a grille of a motor vehicle. An example vehicle includes a fascia, an active grille shutter assembly including a housing, and a reinforcement assembly connected to the fascia and the housing. The reinforcement assembly includes a first bar at least partially nested within a second bar. An assembly and method are also disclosed.

18 Claims, 5 Drawing Sheets

STACKED REINFORCEMENT ASSEMBLY FOR GRILLE OF MOTOR VEHICLE

TECHNICAL FIELD

This disclosure relates to a stacked reinforcement assembly for a grille of a motor vehicle.

BACKGROUND

Motor vehicles are known to include grilles which cover an opening in the body. Some vehicles also include an active grille shutter assembly, including moveable shutters configured to open or close part or all of the grille. Opening the active grille shutter assembly allows air to enter the grille to cool a portion of the vehicle, such as the engine or electric machine. Closing the active grille shutter assembly reduces or stops air from flowing into the grille, which improves the aerodynamics of the vehicle by reducing drag.

SUMMARY

A motor vehicle according to an exemplary aspect of the present disclosure includes, among other things, a fascia, an active grille shutter assembly including a housing, and a reinforcement assembly connected to the fascia and the housing. The reinforcement assembly includes a first bar at least partially nested within a second bar.

In a further non-limiting embodiment of the foregoing motor vehicle, the first and second bars extend along their respective lengths in a direction substantially normal to a centerline of the motor vehicle.

In a further non-limiting embodiment of any of the foregoing motor vehicles, the first bar is an upper bar of a first set of bars, the first set of bars includes a lower bar extending substantially parallel to the upper bar, the second bar is an upper bar of a second set of bars, the second set of bars includes a lower bar extending substantially parallel to the upper bar, and the lower bar of the first set is at least partially nested within the lower bar of the second set.

In a further non-limiting embodiment of any of the foregoing motor vehicles, the second set of bars is forward of the first set of bars.

In a further non-limiting embodiment of any of the foregoing motor vehicles, the upper and lower bars of the first set are vertically offset from one another by a plurality of vertical supports.

In a further non-limiting embodiment of any of the foregoing motor vehicles, the first set of bars are integrally molded to provide a one-piece structure.

In a further non-limiting embodiment of any of the foregoing motor vehicles, the first set of bars are made of a polymer material.

In a further non-limiting embodiment of any of the foregoing motor vehicles, the second set of bars are vertically spaced-apart from one another.

In a further non-limiting embodiment of any of the foregoing motor vehicles, the second set of bars are made of a metallic material.

In a further non-limiting embodiment of any of the foregoing motor vehicles, the vehicle includes a forward bracket, and the lower bar of the second set is at least partially nested within the forward bracket.

In a further non-limiting embodiment of any of the foregoing motor vehicles, the forward bracket is directly connected to the fascia.

In a further non-limiting embodiment of any of the foregoing motor vehicles, the vehicle includes a first rearward bracket and a second rearward bracket, and the first and second rearward brackets are directly connected to the first set of bars and the housing via a plurality of fasteners.

In a further non-limiting embodiment of any of the foregoing motor vehicles, first and second rearward brackets are also directly connected to a body structure of the motor vehicle via a plurality of fasteners.

In a further non-limiting embodiment of any of the foregoing motor vehicles, the body structure is a bolster of the motor vehicle.

An assembly for a motor vehicle according to an exemplary aspect of the present disclosure includes, among other things, an active grille shutter assembly including a housing, and a reinforcement assembly connected to the housing. The reinforcement assembly includes a first bar at least partially nested within a second bar.

In a further non-limiting embodiment of the foregoing assembly, the first bar is an upper bar of a first set of bars, the first set of bars includes a lower bar extending substantially parallel to the upper bar, the second bar is an upper bar of a second set of bars, the second set of bars includes a lower bar extending substantially parallel to the upper bar, and the lower bar of the first set is at least partially nested within the lower bar of the second set.

In a further non-limiting embodiment of any of the foregoing assemblies, the assembly includes a forward bracket, and the lower bar of the second set is at least partially nested within the forward bracket.

In a further non-limiting embodiment of any of the foregoing assemblies, the assembly includes a first rearward bracket and a second rearward bracket, and the first and second rearward brackets are directly connected to the first set of bars and the housing via a plurality of fasteners.

A method according to an exemplary aspect of the present disclosure includes, among other things, arranging a reinforcement assembly including a first set of bars and a second set of bars relative to a housing of an active grille shutter assembly by partially nesting the first set of bars within the second set of bars.

In a further non-limiting embodiment of the foregoing method, the method includes arranging a forward bracket relative to a lower bar of the second set of bars, attaching a fascia to the forward bracket, and attaching first and second rearward brackets to the first set of bars and to the housing of the active grille shutter assembly. Further, after attaching the reinforcement assembly to the housing, the method includes attaching a combined unit including the reinforcement assembly and the housing to a body structure of a vehicle.

DETAILED DESCRIPTION

This disclosure relates to a stacked reinforcement assembly for a grille of a motor vehicle. An example vehicle includes a fascia, an active grille shutter assembly including a housing, and a reinforcement assembly connected to the fascia and the housing. The reinforcement assembly includes a first bar at least partially nested within a second bar. The reinforcement assembly is relatively compact while also providing rigidity to the fascia, which may be a portion of a grille. The reinforcement assembly is also relatively easily assembled and aligned, because it may be first mounted to an active grille shutter assembly housing, and then the combined active grille shutter assembly and the reinforcement assembly may be mounted together to a vehicle body structure. These and other benefits will be appreciated from the below description.

Figure 1:
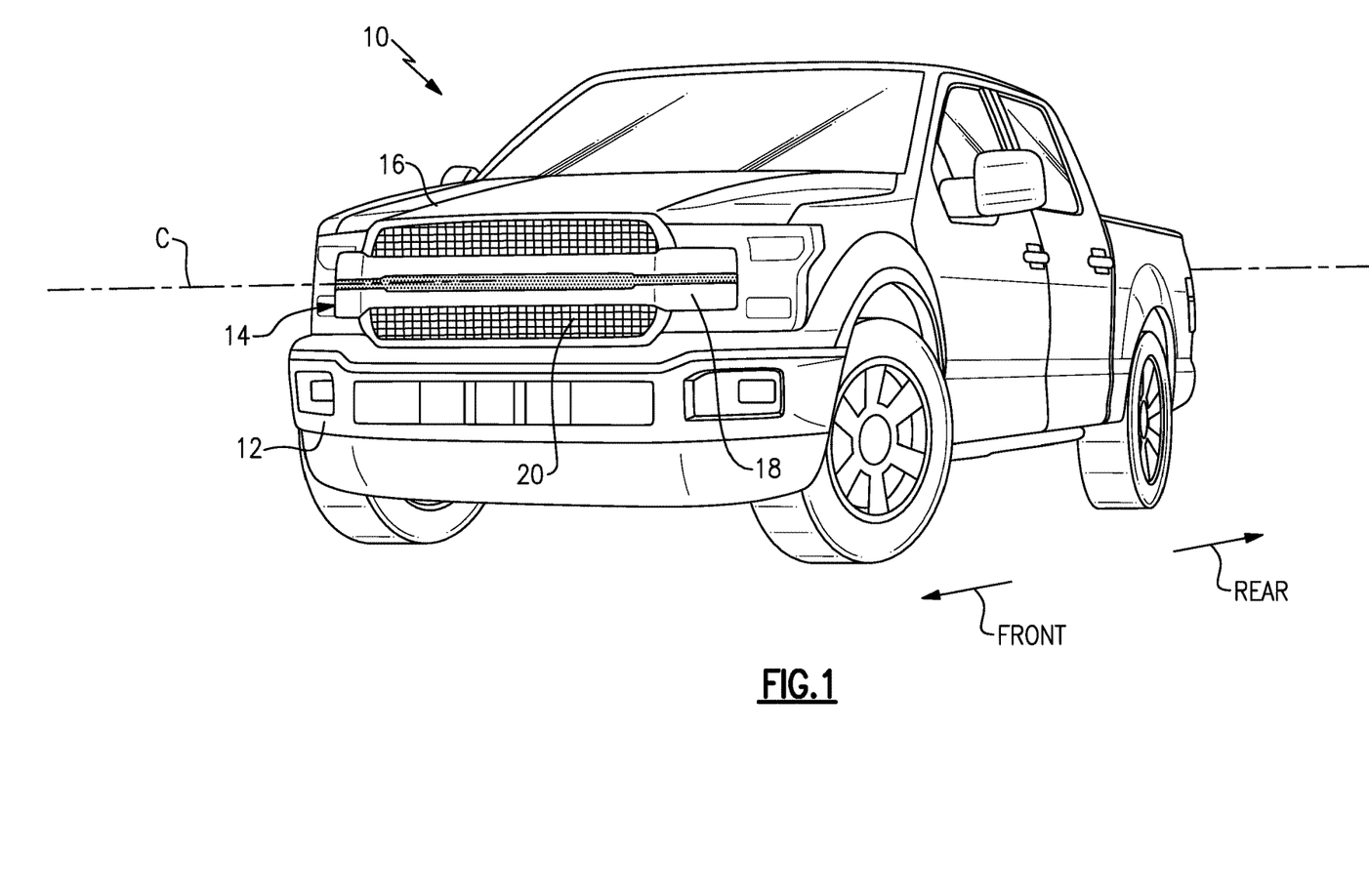
FIG. 1 is a front-perspective view of a motor vehicle, which in this example is a pickup truck.

FIG. 1 illustrates a motor vehicle 10 ("vehicle 10"), which in this example is a pickup truck. While a pickup truck is shown in FIG. 1, this disclosure extends to other types of vehicles, such as sport utility vehicles (SUVs). The vehicle 10 includes a front bumper 12, and a grille 14 vertically above the front bumper 12 and below a hood 16 of the vehicle 10. The front bumper 12 includes one or more pieces of fascia. The grille 14, in this example, includes a forward-facing fascia 18 which has a length dimension extending in a direction substantially normal to the centerline C of the vehicle 10. The "front" and "rear" directions are labeled in certain figures for ease of reference.

The fascia of the front bumper 12 and the grille 14 may be made of a metal or plastic material. In this example, the front bumper 12 and the grille 14 are substantially vertically in-line with one another relative to their position at the front end of the vehicle 10. In particular, the front-most portion of the front bumper 12 and the front-most portion of the grille 14 lie in the same vertically-extending plane and define a forward-most portion of the vehicle 10.

With further reference to the grille 14, the fascia 18 generally contributes to the aesthetic appearance of the vehicle 10 while also covering a portion of an opening in the front of the vehicle 10. A section 20 of the fascia 18 permits air to flow in and out of the opening. The section 20 could include grating, such as a screen, and could be formed integrally or separately from the remainder of the fascia of the grille 14. While headlamps are laterally outside the fascia 18, in this example, the fascia 18 could surround the headlamps in other examples.

Rearward of the fascia 18, the vehicle 10 includes an active grille shutter assembly 22 (FIG. 2) including a housing 24 supporting a plurality of moveable shutters 26 configured to selectively open and close. Opening the shutters 26 allows air to enter the grille 14 to cool a portion of the vehicle 10, such as the engine or electric machine of the vehicle 10. In this respect, this disclosure applies to electrified vehicles and vehicles including an internal combustion engine. Closing the shutters 26 reduces or stops air from flowing into the grille 14, which improves the aerodynamics of the vehicle 10 by reducing drag.

Figure 2:
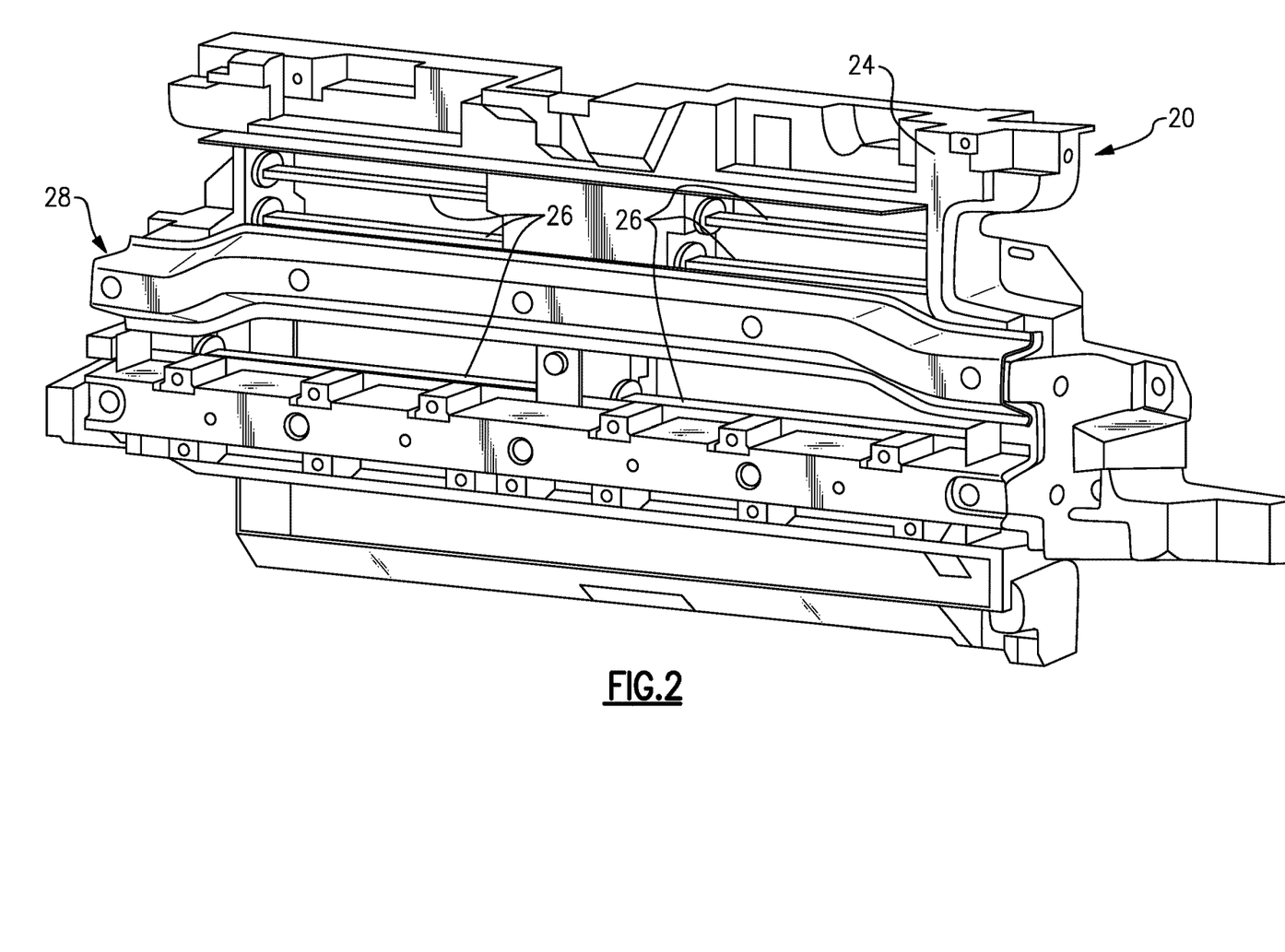
FIG. 2 is a front-perspective view of an example reinforcement assembly mounted to an example active grille shutter assembly.

In this disclosure, a reinforcement assembly 28 is connected to between the housing 24 of the active grill shutter assembly 22 and the fascia of the front bumper 12 and/or the grille 14. An example reinforcement assembly 28 is illustrated in FIG. 2, and includes a plurality of bars that are stacked relative to one another such that at least one bar is at least partially nested within another bar. As such, the reinforcement assembly 28 is relatively compact and is particularly beneficial in vehicles where the grille requires increased stiffness, such as in vehicles with front bumpers and grilles that are substantially vertically in-line with one another at the front of the vehicle. The reinforcement assembly 28 is also beneficial in vehicles with small front bumpers or with front bumpers arranged relatively high off the ground, such as in the case of some pickup trucks and SUVs.

Figure 3:
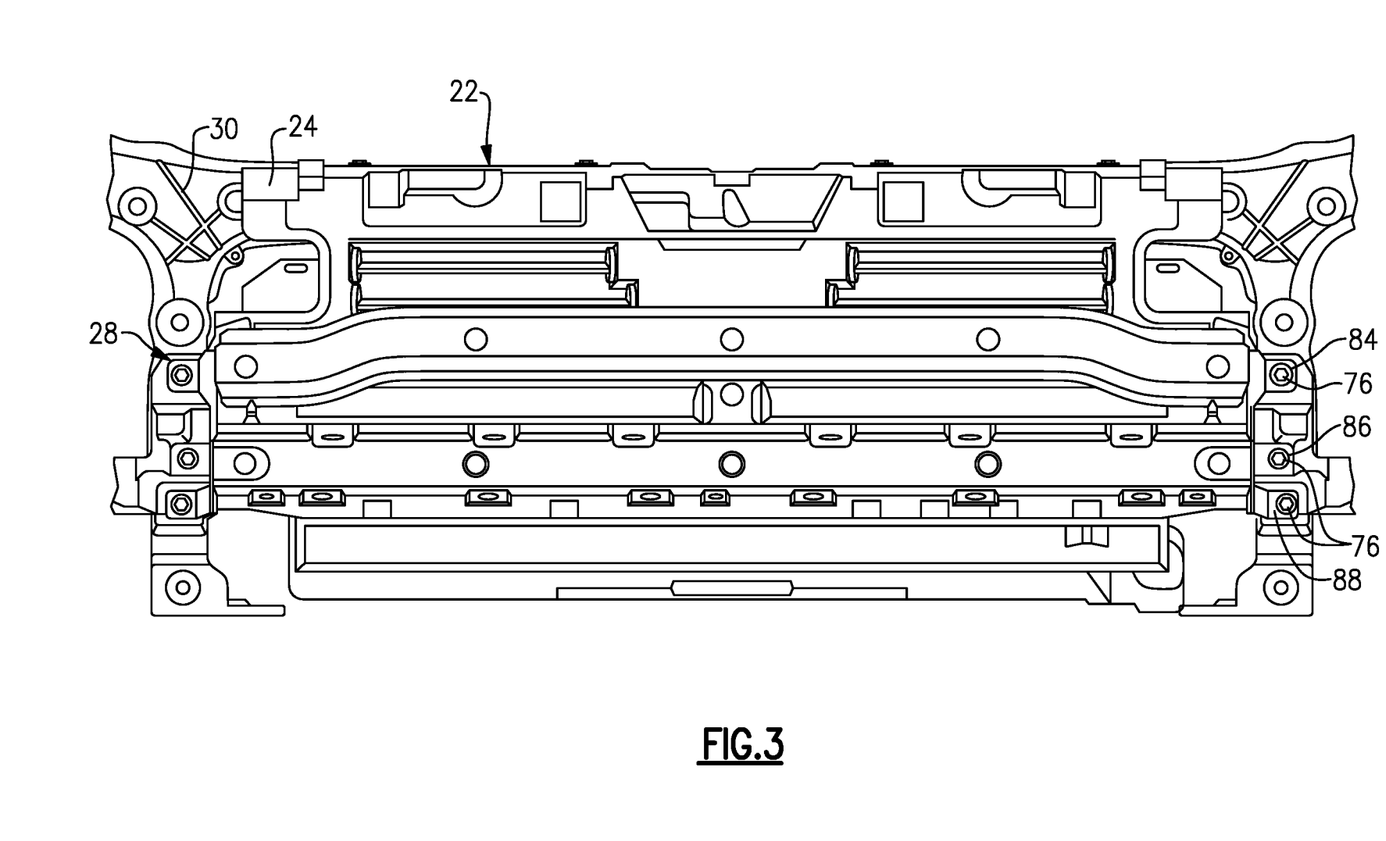
FIG. 3 is a front view of the reinforcement assembly and the active grille shutter assembly mounted to a bolster.

With reference to FIGS. 2 and 3, the reinforcement assembly 28 is mounted to the housing 24 of the active grille shutter assembly 22, which is in turn mounted to a body structure of the vehicle 10. The body structure, in this example, is a bolster 30 (FIG. 3), which may be made of magnesium. The bolster 30 is sometimes referred to as a radiator support or a grille opening reinforcement.

The reinforcement assembly 28 and the active grille shutter assembly 22 may be attached to the bolster 30 as a single unit. In other words, the reinforcement assembly 28 may be attached to the active grille shutter assembly 22 before the two are attached to the bolster 30. This increases the ease of aligning the reinforcement assembly 28 and active grille shutter assembly 22 relative to the bolster 30.

Figure 4:
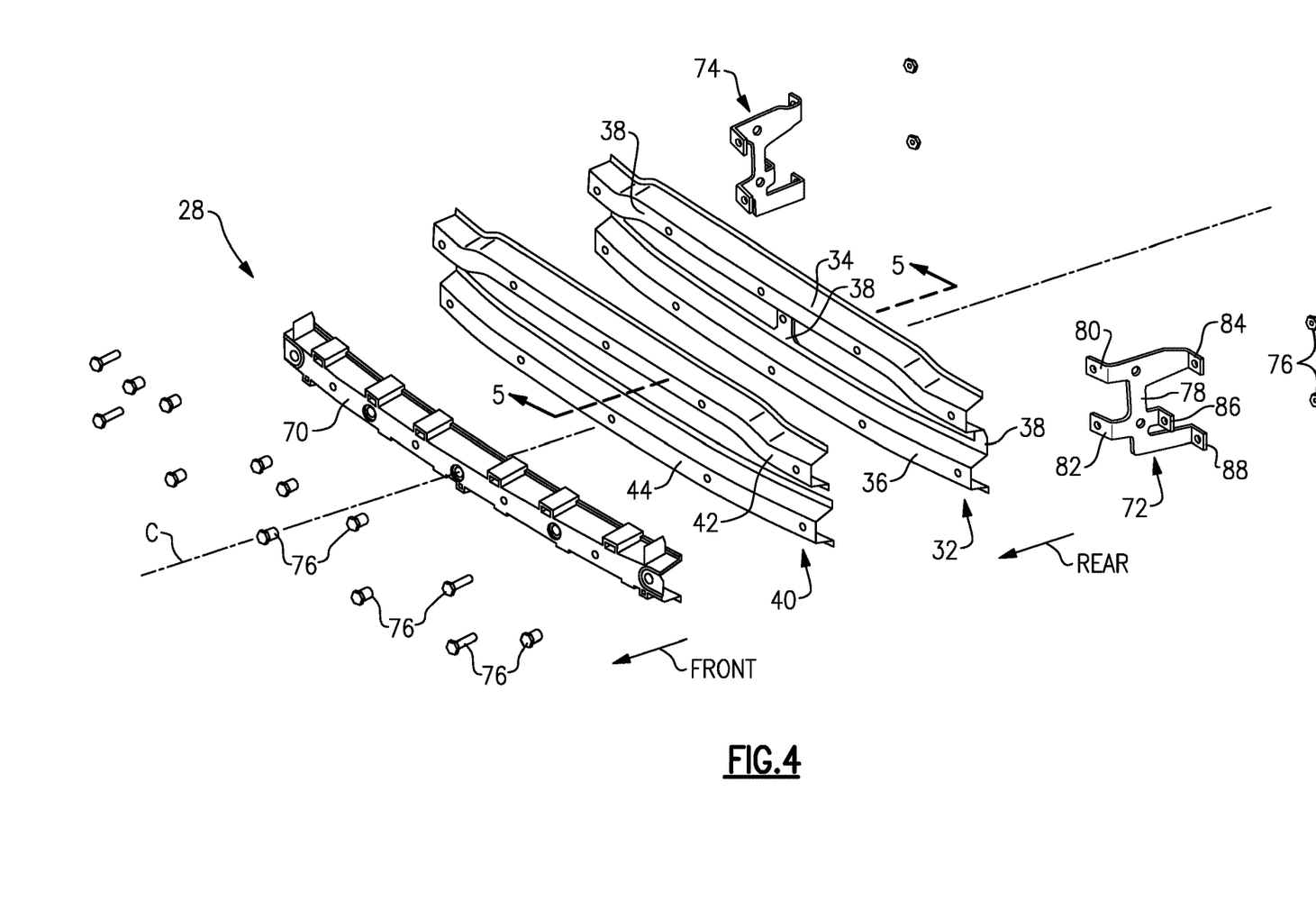
FIG. 4 is a perspective, exploded view of the reinforcement assembly.

FIG. 4 is an exploded view of an example reinforcement assembly 28. As shown, the reinforcement assembly 28 includes a first set of bars 32 including an upper bar 34 and a lower bar 36 vertically below the upper bar 34. The upper and lower bars 32, 34 extend substantially parallel to one another along their respective lengths. The lengths of the upper and lower bars 34, 36 are substantially equal to the largest dimension of the housing 24. The upper and lower bars 34, 36 extend along their respective lengths in a direction substantially normal to the centerline C from a point adjacent one side of the vehicle 10 to a point adjacent another side of the vehicle 10.

In this example, the upper and lower bars 34, 36 are vertically offset from one another by a plurality of vertical supports 38. There are three vertical supports 38 in this example, with two being arranged adjacent opposite ends of the upper and lower bars 34, 36 and another being arranged on the centerline C. In an example, the first set of bars 32 are integrally molded to provide a one-piece structure that provides, without any joints or seams, the upper and lower bars 34, 36 and the vertical supports 38. The first set of bars 32 are made of a polymer material in one example.

Forward of the first set of bars 32, the reinforcement assembly 28 includes a second set of bars 40. The second set of bars 40 includes an upper bar 42 and a lower bar 44 vertically below the upper bar 42. The upper and lower bars 42, 44 extend parallel to one another and parallel to a corresponding one of the upper and lower bars 34, 36. The upper and lower bars 42, 44 extend along their respective lengths in a direction substantially normal to the centerline C. The lengths of the upper and lower bars 42, 44 are substantially equal to the lengths of the corresponding upper and lower bars 34, 36.

The second set of bars 40 are vertically spaced-apart from one another such that they do not directly contact one another. The upper bar 42 is vertically aligned with the upper bar 34, and the lower bar 44 is vertically aligned with the lower bar 36. In this example, both of the upper and lower bars 42, 44 are made of a metallic material, such as steel, to provide the reinforcement assembly 28, and in turn the fascia of the front bumper 12 and/or grille 14, with rigidity.

In order to provide a relatively compact arrangement, the first and second sets of bars 32, 40 are stacked relative to one another. In particular, the upper bar 34 is partially nested within the upper bar 42 and the lower bar 36 is nested within the lower bar 44. The term nested, as used herein, means that at least a portion of the upper bar 34, for example, is received in a recess defined by the upper bar 42.

Figure 5:
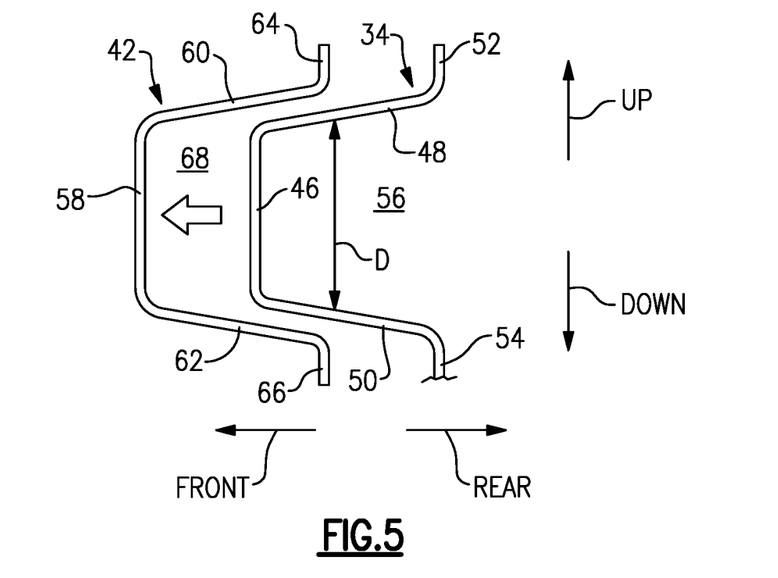
FIG. 5 is a cross-sectional view taken along line 5-5 from FIG. 4, and illustrates an example manner in which a first bar is partially nested within a second bar.

An example stacked arrangement where the upper bar 34 is nested relative to the upper bar 42 shown relative to FIG. 5. As shown in FIG. 5, the upper bar 34, in cross-section, includes a forward wall 46, an inclined upper wall 48 extending rearward and upward from an upper edge of the forward wall 46, and a lower wall 50 extending rearward and downward from a lower edge of the forward wall 46. The "front," "rear," "up," and "down" directions are labeled in FIG. 5 for reference. Moving in the front direction toward the forward wall 46, a vertical dimension D between the upper wall 48 and lower wall 50 gradually reduces. In this regard, the upper bar 34 is tapered toward the forward wall 46.

Opposite the forward wall 46, the upper and lower walls 48, 50 include corresponding upper and lower flanges 52, 54 projecting vertically upward and downward therefrom, respectively. The lower flange 54, in this example, blends into the middle-most vertical support 38. The upper and lower flanges 52, 54 assist with depth control and alignment, but are not required in all examples.

When viewed from the front, the forward wall 46, upper wall 48, and lower wall 50 are generally convex and define a projection. The projection projects forward from the upper and lower flanges 52, 54, in this example. Further, the projection is tapered. When viewed from the rear, the forward wall 46, upper wall 48, and lower wall 50 define a recess 56, which is generally concave. The recess 56 is open facing the rear direction. The recess could be partially filled with ribs or another reinforcing structure, in other examples.

The upper bar 42 is shaped substantially similar to the upper bar 34, with the exception that the upper bar 42 does not include a lower flange that blends into a vertical support, because the second set of bars 40 does not include vertical supports in this example. The upper bar 42 includes a forward wall 58, upper and lower walls 60, 62, and upper and lower flanges 64, 66 arranged substantially the same as the corresponding structures of the upper bar 34. When viewed from the rear, the forward wall 58 and upper and lower walls 60, 62 define a recess 68.

While only the upper bars 34, 42 have been described in detail, the lower bars 36, 44 include a substantially similar cross-sectional profile. The first and second sets of bars 32, 40 may exhibit this above-discussed cross-sectional profile along substantially their entire lengths. In a particular example, at least the second set of bars 40 exhibits the above-discussed cross-sectional profile along their entire lengths.

The above-discussed cross-sectional profile permits the upper bar 34 to partially nest within the upper bar 42. In particular, the projection of the upper bar 34 is received at least partially within the recess 68 of the upper bar 42 such that the forward wall 46 projects forward of a vertical plane containing the upper and lower flanges 64, 66. In a further example, the forward wall 46 is in direct contact with or nearly in direct contact with the forward wall 58. Further, the lower bar 36 is partially nested within the lower bar 44 in substantially the same manner. In other examples, it is possible for the first set of bars 32 to be fully nested within the second set of bars 40.

With reference to FIG. 4, the reinforcement assembly 28 further includes a forward bracket 70. The forward bracket 70 is forward of the lower bar 44 and, in this example, the forward bracket 70 exhibits a cross-sectional profile substantially similar to the above-discussed cross-sectional profile of the upper bars 34, 42. As such, the forward bracket 70 includes a recess when viewed from a rear, and the lower bar 44 is partially nested within the forward bracket 70. The forward bracket 70 is configured to directly connect to the fascia 18 and/or the front bumper 12. As such, the reinforcement assembly 28 supports the fascia 18 and/or the front bumper 12 via the forward bracket 70.

The reinforcement assembly 28 further includes a first rearward bracket 72 and a second rearward bracket 74. The first and second rearward brackets 72, 74 are directly connected to the first set of bars 32 and the housing 24 via a plurality of fasteners 76. The fasteners 76 may be bolts, rivets, screws, washers, and compression limiters, as examples.

The first and second rearward brackets 72, 74 are substantially similar. In this example, the first and second rearward brackets 72, 74 are identical with the exception that they are reflected about the centerline C. The first and second rearward brackets 72, 74 are configured to facilitate fastening the various pieces of the reinforcement assembly 28 together. Further, the first and second rearward brackets 72, 74 facilitate fastening of the reinforcement assembly 28 to the housing 24 and, in a separate manufacturing step, they also facilitate mounting the combined unit including the housing 24 and the reinforcement assembly 28 onto the bolster 30.

Reference now will be made to the structure of the first rearward bracket 72 and the manner in which the reinforcement assembly 28 is mounted to the first rearward bracket 72, as well as the manner in which the first rearward bracket 72 facilitates attachment of the reinforcement assembly 28 to the housing 24 and ultimately to the bolster 30. Again, it should be understood that the second rearward bracket 74 is arranged substantially similarly to the first rearward bracket 72 and is used in a similar manner.

The first rearward bracket 72 includes a main body portion 78 which extends vertically. Two vertically spaced-apart inward tabs 80, 82 project inward, toward the centerline C, from the main body portion 78. Three vertically spaced-apart outward tabs 84, 86, 88 project outward, away from the centerline C, from the main body portion 78. The inward tabs 80, 82 are in a common vertical plane. Two of the outward tabs 84, 88, which are upper and lower outward tabs, respectively, are in a common vertical plane that is spaced-apart rearward of the middle-most outward tab 86.

Figure 6:
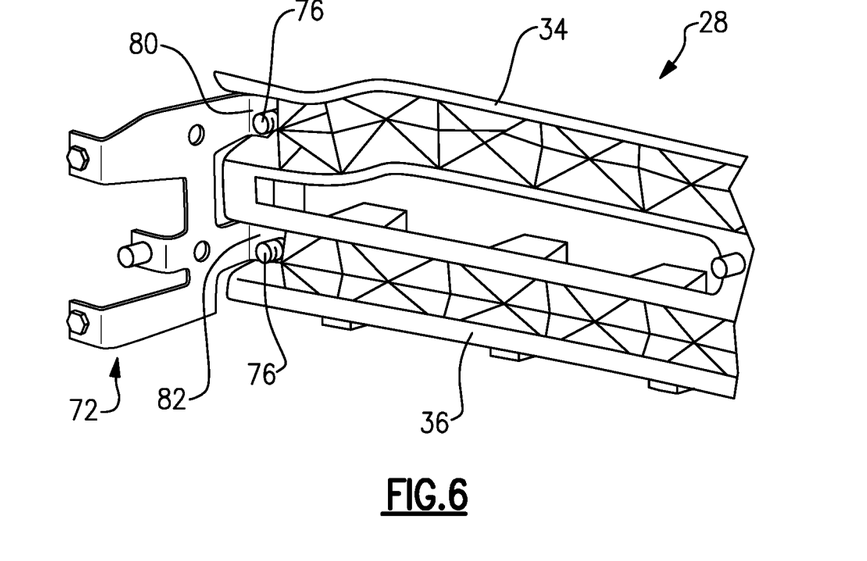
FIG. 6 is a rear-perspective view of the reinforcement assembly.

With reference to FIGS. 4 and 6, the inward tab 80 is in direct contact with the rear surface of the upper bar 34, namely the rear surface of the forward wall 46. Fasteners interface with the upper bar 44 and the inward tab 80 to hold the upper bars 34, 44 in place relative to the first rearward bracket 72. Further, the lower inward tab 82 is in direct contact with a rear surface of the lower bar 36. Fasteners interface with the forward bracket 70 and the inward tab 82 to hold the forward bracket 70 and lower bars 36, 44 in place relative to the first rearward bracket 72.

Following attachment to the inward tabs 80, 82, the reinforcement assembly 28 is mounted to the housing 24 via a fastener 76 that interfaces with the outward tab 86 and the housing 24. The reinforcement assembly 28 may also be attached to the housing 24 via a fastener interfacing with the middle-most vertical support 38. The housing 24 may include a threaded opening aligned with the openings in the vertical support 38 and the outward tab 86, for example.

After the reinforcement assembly 28 is mounted to the housing 24, which can be done in a first facility, the combined unit can be attached to the bolster 30, which can be done in a second facility. In this example, fasteners 76 interfacing with the outward tabs 84, 88 are used to attach the combined unit to the bolster 30. The bolster 30 may include threaded openings corresponding to the openings in the outward tabs 84, 88 in on example.

It should be understood that terms such as "about," "substantially," and "generally" are not intended to be boundaryless terms, and should be interpreted consistent with the way one skilled in the art would interpret those terms. Further, directional terms such as "forward," "rearward," "upward," "downward," "vertical," "horizontal," etc., are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, comprising:
 a fascia;
 an active grille shutter assembly including a housing; and
 a reinforcement assembly connected to the fascia and the housing, the reinforcement assembly including a first bar at least partially nested within a second bar,
 wherein the first bar is an upper bar of a first set of bars,
 wherein the first set of bars includes a lower bar extending substantially parallel to the upper bar,
 wherein the second bar is an upper bar of a second set of bars,
 wherein the second set of bars includes a lower bar extending substantially parallel to the upper bar, and
 wherein the lower bar of the first set is at least partially nested within the lower bar of the second set.

2. The motor vehicle as recited in claim 1, wherein the first and second bars extend along their respective lengths in a direction substantially normal to a centerline of the motor vehicle.

3. The motor vehicle as recited in claim 1, wherein the second set of bars is forward of the first set of bars.

4. The motor vehicle as recited in claim 1, wherein the upper and lower bars of the first set are vertically offset from one another by a plurality of vertical supports.

5. The motor vehicle as recited in claim 4, wherein the first set of bars are integrally molded to provide a one-piece structure.

6. The motor vehicle as recited in claim 5, wherein the first set of bars are made of a polymer material.

7. The motor vehicle as recited in claim 1, wherein the second set of bars are vertically spaced-apart from one another.

8. The motor vehicle as recited in claim 7, wherein the second set of bars are made of a metallic material.

9. The motor vehicle as recited in claim 1, further comprising:
 a forward bracket;
 wherein the lower bar of the second set is at least partially nested within the forward bracket.

10. The motor vehicle as recited in claim 9, wherein the forward bracket is directly connected to the fascia.

11. The motor vehicle as recited in claim 1, further comprising:
 a first rearward bracket; and
 a second rearward bracket;
 wherein the first and second rearward brackets are directly connected to the first set of bars and the housing via a plurality of fasteners.

12. The motor vehicle as recited in claim 11, wherein the first and second rearward brackets are also directly connected to a body structure of the motor vehicle via a plurality of fasteners.

13. The motor vehicle as recited in claim 12, wherein the body structure is a bolster of the motor vehicle.

14. An assembly for a motor vehicle, comprising:
 an active grille shutter assembly including a housing; and
 a reinforcement assembly connected to the housing, the reinforcement assembly including a first bar at least partially nested within a second bar,
 wherein the first bar is an upper bar of a first set of bars,
 wherein the first set of bars includes a lower bar extending substantially parallel to the upper bar,
 wherein the second bar is an upper bar of a second set of bars,
 wherein the second set of bars includes a lower bar extending substantially parallel to the upper bar, and
 wherein the lower bar of the first set is at least partially nested within the lower bar of the second set.

15. The assembly as recited in claim 14, further comprising:
 a forward bracket;
 wherein the lower bar of the second set is at least partially nested within the forward bracket.

16. The assembly as recited in claim 15, further comprising:
 a first rearward bracket; and
 a second rearward bracket;
 wherein the first and second rearward brackets are directly connected to the first set of bars and the housing via a plurality of fasteners.

17. A method, comprising:
 arranging a reinforcement assembly including a first set of bars and a second set of bars relative to a housing of an active grille shutter assembly by partially nesting the first set of bars within the second set of bars,
 wherein the first set of bars includes an upper bar and a lower bar extending substantially parallel to the upper bar,
 wherein the second set of bars includes an upper bar and a lower bar extending substantially parallel to the upper bar,
 wherein the lower bar of the first set is at least partially nested within the lower bar of the second set, and
 wherein the upper bar of the first set is at least partially nested within the upper bar of the second set.

18. The method as recited in claim 17, further comprising:
arranging a forward bracket relative to a lower bar of the second set of bars;
attaching a fascia to the forward bracket;
attaching first and second rearward brackets to the first set of bars and to the housing of the active grille shutter assembly; and
after attaching the reinforcement assembly to the housing, attaching a combined unit including the reinforcement assembly and the housing to a body structure of a vehicle.

* * * * *